United States Patent
Sun et al.

(10) Patent No.: US 10,863,245 B2
(45) Date of Patent: Dec. 8, 2020

(54) AUGMENTATION OF AUDIO/VIDEO CONTENT WITH ENHANCED INTERACTIVE CONTENT

(71) Applicant: Rovi Guides, Inc., San Jose, CA (US)

(72) Inventors: Jing Sun, King of Prussia, PA (US); Yunbo Tang, Malvern, PA (US)

(73) Assignee: Rovi Guides, Inc., San Jose, CA (US)

( * ) Notice: Subject to any disclaimer, the term of this patent is extended or adjusted under 35 U.S.C. 154(b) by 15 days.

(21) Appl. No.: 16/144,340

(22) Filed: Sep. 27, 2018

(65) Prior Publication Data
US 2020/0107079 A1    Apr. 2, 2020

(51) Int. Cl.
*H04N 21/488* (2011.01)
*H04N 21/845* (2011.01)
*H04N 21/81* (2011.01)

(52) U.S. Cl.
CPC ..... *H04N 21/4888* (2013.01); *H04N 21/4884* (2013.01); *H04N 21/8133* (2013.01); *H04N 21/8456* (2013.01)

(58) Field of Classification Search
CPC .......... H04N 21/4888; H04N 21/8133; H04N 21/8456; H04N 21/4884; H04N 21/4722; H04N 21/8545; H04N 21/8126; G06K 9/00711
See application file for complete search history.

(56) References Cited

U.S. PATENT DOCUMENTS

| 7,761,892 | B2 | 7/2010 | Ellis et al. | |
| 2009/0064235 | A1* | 3/2009 | Sugahara | H04N 5/44508 725/61 |
| 2010/0043040 | A1 | 2/2010 | Olsen | |
| 2015/0082349 | A1* | 3/2015 | Ishtiaq | H04N 21/23418 725/40 |
| 2017/0359622 | A1* | 12/2017 | Gopalan | H04N 21/84 |

* cited by examiner

*Primary Examiner* — Benjamin R Bruckart
*Assistant Examiner* — Tien M Nguyen
(74) *Attorney, Agent, or Firm* — Haley Guiliano LLP

(57) ABSTRACT

Provided are systems and methods for augmenting audio/video content with enhanced interactive content. Events are detected in the audio/video content and contextual information is determined corresponding to the events using enhanced metadata and content-specific data. Indicators are displayed to indicate the occurrence of an event and the information about the event is provided.

16 Claims, 4 Drawing Sheets

AUGMENTATION OF AUDIO/VIDEO CONTENT WITH ENHANCED INTERACTIVE CONTENT

The present disclosure is directed towards augmentation of audio/video content with enhanced interactive content for display on user equipment.

BACKGROUND

Video and audio content sometimes relies on a consumer of that content to be knowledgeable about a particular subject in order to fully understand and appreciate the content. For example, sports broadcasts presume that the viewer understands the rules of the particular sport being broadcast. Certain sports broadcasts might include commentary from, for example, announcers. However, such commentary often does not provide sufficient detail to a viewer who has very little or no understanding of nuances of the sport.

SUMMARY

The present disclosure provides a computer-implemented method for augmenting audio/video content. The method comprises detecting, using processing equipment, an event during a time segment of the audio/video content based on data in the audio/video content corresponding to the time segment. The method further comprises identifying, using the processing equipment, enhanced metadata associated with the event in an enhanced metadata database. The method further comprises extracting, using the processing equipment, content-specific data from the audio/video content. The method further comprises augmenting, using the processing equipment, the audio/video content with the enhanced metadata and with the content-specific data to generate augmented content. The method further comprises providing the augmented content for display on user equipment during playback of the time segment.

The present disclosure provides a system for augmenting audio/video content. The system comprises electronic storage equipment configured to store an enhanced metadata database. The system further comprises processing equipment coupled to the electronic storage equipment and configured to detect an event during a time segment of the audio/video content based on data in the audio/video content corresponding to the time segment. The processing equipment is further configured to identify enhanced metadata associated with the event in the enhanced metadata database. The processing equipment is further configured to extract content-specific data from the audio/video content. The processing equipment is further configured to augment the audio/video content with the enhanced metadata and with the content-specific data to generate augmented content. The processing equipment is further configured to provide the augmented content for display on user equipment during playback of the time segment.

The present disclosure provides a non-transitory computer-readable medium having computer instructions stored thereon for programming a computer to perform a method comprising detecting, using processing equipment, an event during a time segment of the audio/video content based on data in the audio/video content corresponding to the time segment. The method further comprises identifying, using the processing equipment, enhanced metadata associated with the event in an enhanced metadata database. The method further comprises extracting, using the processing equipment, content-specific data from the audio/video content. The method further comprises augmenting, using the processing equipment, the audio/video content with the enhanced metadata and with the content-specific data to generate augmented content. The method further comprises providing the augmented content for display on user equipment during playback of the time segment.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts.

DETAILED DESCRIPTION

The present disclosure provides systems and methods for providing audio/video content that has been augmented to include contextual information. More particularly, audio/video content is augmented with contextual information derived from the content itself, from enhanced metadata, or both.

For example, the audio/video content may be related to a sports broadcast. In this example, as events take place during the course of the sports broadcast, interactive indicators may be displayed in real time on a display device of the user equipment indicating that contextual information is available regarding an event taking place in the sports broadcast. When an indicator is selected, respective information may be displayed about an event that is currently taking place or has very recently taken place in the sports broadcast. For example, one or more applicable rules associated with the event may be displayed to help explain what is currently happening. In some embodiments, specific contextual information may be used to add clarity to the event, such as providing names of players, names of teams, any other suitable information specific to the particular sports broadcast, or any combination thereof.

Figure 1:
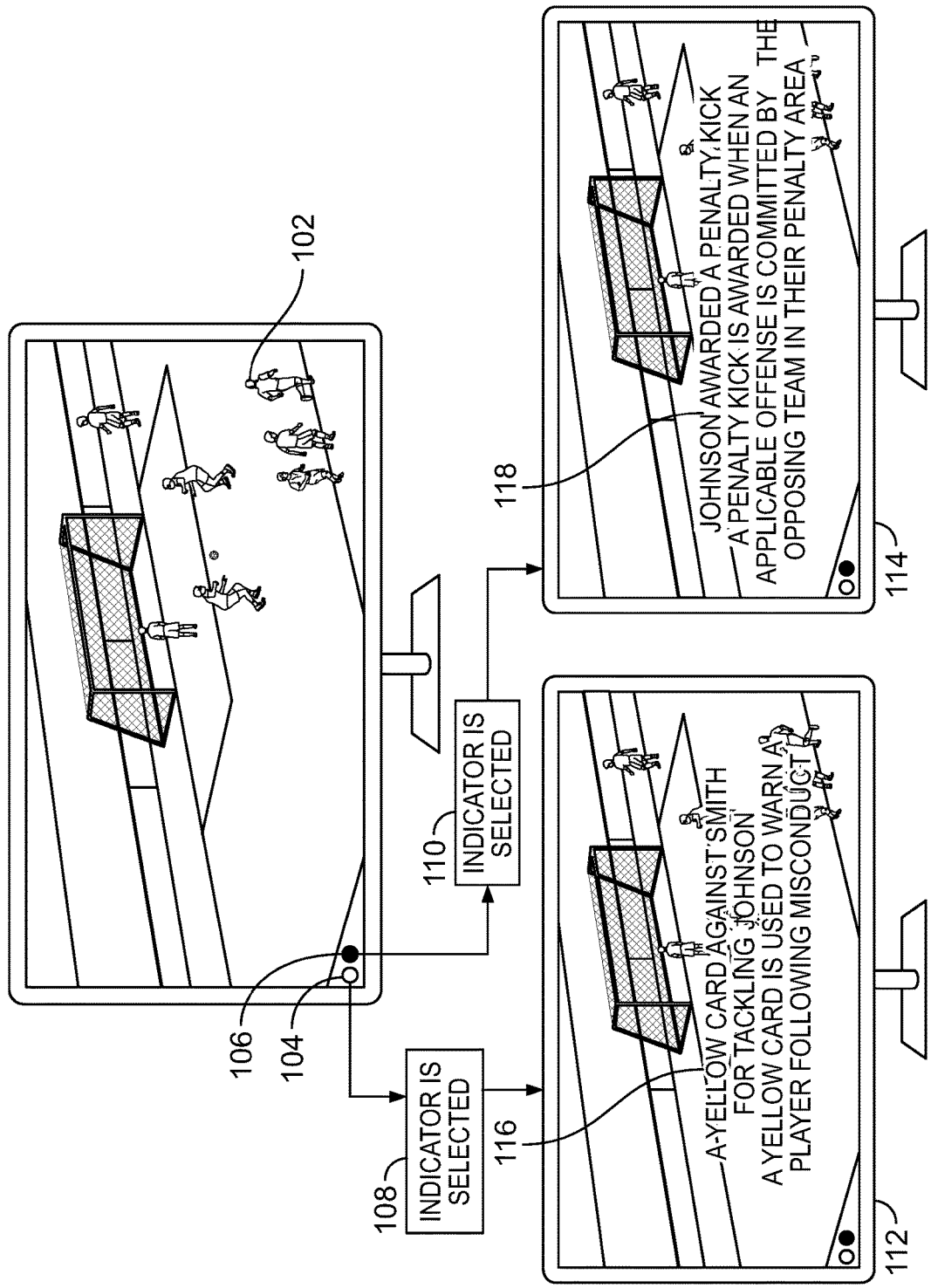
FIG. 1 shows an illustrative use case of enhanced interactive content in accordance with some embodiment of the present disclosure.

FIG. 1 illustrates this example by showing an audio/video content broadcast display screen 102 of a soccer game. Display screen 102 includes a video image of the soccer game as well as interactive indicators 104 and 106. Indicators are displayed on display screen 102 when enhanced content is available. User selection 108 or 110 of an interactive indicator 104 or 106, respectively, will result in display screen 112 or 114 being displayed, respectively.

As illustrated, interactive indicator 104 corresponds to a yellow card event in the soccer game broadcast. User selection of interactive indicator 104 causes enhanced content 116 to be displayed simultaneously with the soccer game broadcast video. In the illustrated example, enhanced content 116 includes contextual information "A YELLOW CARD AGAINST SMITH FOR TACKLING JOHNSON" providing the user with information about what occurred during the event, including specific information about the players involved. Also included in enhanced content 116 is contextual information "A YELLOW CARD IS USED TO WARN A PLAYER FOLLOWING MISCONDUCT," which provides a recitation of a rule that corresponds to the event. Therefore, by virtue of the contextual information provided by enhanced content 116, the user is informed that the event which has occurred involved a particular player (i.e., "Smith") being given a yellow card for tackling another player (i.e., "Johnson"). To better inform the user, the general definition of a "yellow card" is also provided.

As illustrated, interactive indicator 106 corresponds to a penalty kick event in the soccer game broadcast. User selection of interactive indicator 106 causes enhanced content 118 to be displayed simultaneously with the soccer game broadcast video. In the illustrated example, enhanced content 118 includes contextual information "JOHNSON AWARDED A PENALTY KICK" providing the user with information about what occurred during the event, including specific information about the players involved. Also included in enhanced content 118 is contextual information "A PENALTY KICK IS AWARDED WHEN AN APPLICABLE OFFENSE IS COMMITTED BY THE OPPOSING TEAM IN THEIR PENALTY AREA," which provides a recitation of a rule that corresponds to the event. Therefore, by virtue of the contextual information provided by enhanced content 118, the user is informed that the event that has occurred involved a particular player (i.e., "Johnson") being awarded a penalty kick. To better inform the user, the general rule for when a penalty kick is awarded is also provided.

The interactive enhanced content features described in the present disclosure are provided by a content application. The content application includes any suitable software, hardware, computer and network infrastructure and architecture, or any combination thereof, for implementing the functionality described herein. The content application may be implemented in a single device or across multiple devices. The content application may be implemented in a single location or across multiple locations on one or more computer networks, telecommunications networks, or both. The content application may be implemented on a single platform or across multiple disparate platforms.

"Contextual information" refers to any data relevant to a particular genre of content, to any suitable sub-genre of content, to any specific content, to any specific portion of a specific content, or any combination thereof. Contextual information may include, for example, rules of any particular sport. As discussed above with respect to FIG. 1, contextual information, in that example, includes the rules of soccer as well as definitions of soccer terms. As also discussed with respect to the example of FIG. 1, contextual information includes specific information about the particular audio/video content (i.e., the particular soccer game broadcast in FIG. 1).

Contextual information may include enhanced metadata, content-specific data, or both. "Enhanced metadata" refers to data associated with an audio/visual content or group of audio/video content having something in common. Enhanced metadata is pre-defined and may be delivered together with corresponding audio/visual content or may be communicated separately from corresponding audio/visual content, or both. Enhanced metadata is created and stored specifically to be accessed to be used as contextual information in providing enhanced content in accordance with the present disclosure. In some embodiments, at least a portion of enhanced metadata that corresponds to any particular piece of audio/visional content may be stored in an enhanced metadata database, discussed more fully below.

"Content-specific data" refers to data associated with a particular piece of audio/visual content, which defines specific substantive attributes of that content (e.g., names, places, events, etc.). Content-specific data is distinguished from enhanced metadata in that the content-specific data is not accessed from pre-defined data that was created and stored specifically to be accessed to be used as contextual information in providing enhanced content. Rather, content-specific data is derived from the audio/video content itself. For example, content-specific data may be derived from analyzing caption data of a particular audio/video content.

Different pieces of contextual information can be combined to form new contextual information. For example, enhanced content 116 and 118 are respective amalgamations of different pieces of contextual information. Enhanced content 116 includes enhanced metadata that defines a yellow card event in a soccer game. This metadata is combined with content-specific data defining the relevant actors in the event, "Smith" and "Johnson." In addition, enhanced metadata defining the term "yellow card" is provided. Similarly, enhanced content 118 relies on a combination of enhanced metadata defining a penalty kick event in soccer with content-specific data defining the relevant actor for this event. Enhanced metadata is further used to provide an explanation of a penalty kick in soccer.

"Enhanced interactive content" refers to any of the content used to augment or otherwise enhance audio/video content. Enhanced interactive content includes indicators (interactive, passive, or both) corresponding to events occurring in a corresponding audio/video content. Enhanced interactive content includes any enhanced content provided to a user, such as enhanced content 116 and 118 in the example illustrated in FIG. 1. Enhanced interactive content also includes any relevant contextual information.

"Audio/video content" refers to audio data, video data, other data communicated together with the audio or video data (e.g., caption data, vertical blanking interval data, any other suitable data, or any combination thereof), or any combination thereof, that defines a particular media asset such as a sports broadcast, television show, film, music video, newscast, or any other suitable media asset.

Figure 2:
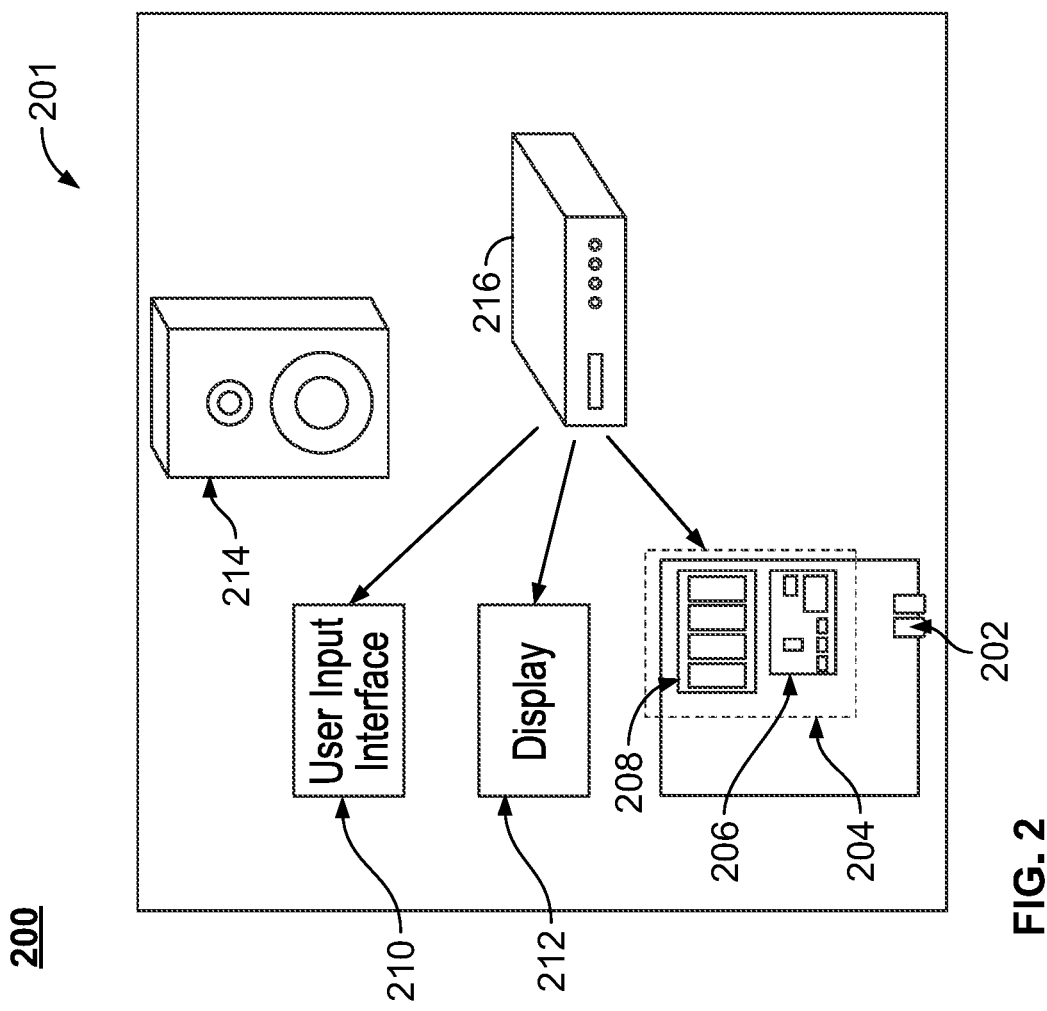
FIG. 2 is a block diagram of an illustrative user equipment device in accordance with some embodiments of the present disclosure.
Figure 2:
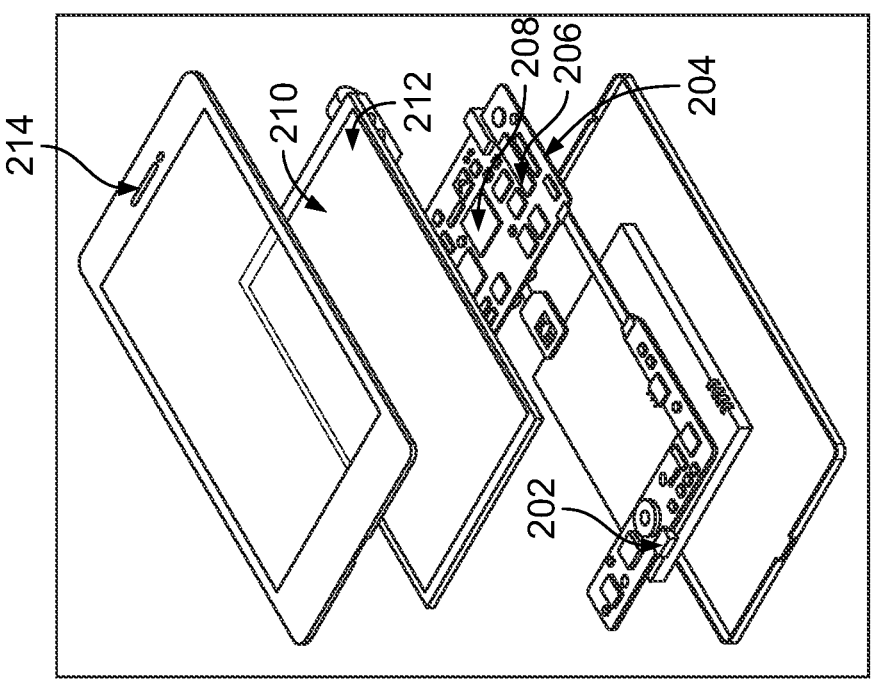

Users may access enhanced interactive content, including contextual information, and the content application from one or more of their user equipment devices. FIG. 2 shows generalized embodiments of illustrative user equipment device 200. For example, user equipment device 200 may be a smartphone device or a remote control. In another example, user equipment system 201 may be a user television equipment system. User television equipment system 201 may include a set-top box 216. Set-top box 216 may be communicatively connected to speaker 214 and display 212. In some embodiments, display 212 may be a television display or a computer display. In some embodiments, set top box 216 may be communicatively connected to user interface input 210. In some embodiments, user interface input 210 may be a remote control device. Set-top box 216 may include one or more circuit boards. In some embodiments, the circuit boards may include processing circuitry, control circuitry, and storage (e.g., RAM, ROM, Hard Disk, Removable Disk, etc.). In some embodiments, circuit boards may include an input/output path. More specific implementations of user equipment devices are discussed below in connection with FIG. 3. Each one of user equipment device 200 and user equipment system 201 may receive content and data via input/output (hereinafter "I/O") path 202. I/O path 202 may provide content (e.g., broadcast programming, on-demand programming, Internet content, content available over a local area network (LAN) or wide area network (WAN), enhanced interactive content (including contextual information) and/or other content) and data to control circuitry 204, which includes processing circuitry 206 and storage 208. Control circuitry 204 may be used to send and receive commands, requests, and other suitable data using I/O path 202. I/O path 202 may connect control circuitry 204 (and specifically processing circuitry 206) to one or more communications paths (described below). I/O functions may be provided by one or more of these communications paths but are shown as a single path in FIG. 2 to avoid overcomplicating the drawing.

Control circuitry 204 may be based on any suitable processing circuitry such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 204 executes instructions for an application stored in memory (e.g., storage 208), such the content application. Specifically, control circuitry 204 may be instructed by the content application to perform the functions discussed above and below. For example, the content application may provide instructions to control circuitry 204 to generate the enhanced interactive content, including indicators and contextual information. In some implementations, any action performed by control circuitry 204 may be based on instructions received from the content application.

In client-server based embodiments, control circuitry 204 may include communications circuitry suitable for communicating with a content application server or other networks or servers. The instructions for carrying out the above-mentioned functionality may be stored on the content application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 3). In addition, communications circuitry may include circuitry that enables peer-to-peer communication of user equipment devices, or communication of user equipment devices in locations remote from each other (described in more detail below).

Memory may be an electronic storage device provided as storage 208 that is part of control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content described herein as well as enhanced interactive content data described above. Nonvolatile memory may also be used (e.g., to launch a boot-up routine and other instructions). Cloud-based storage, described in relation to FIG. 3, may be used to supplement storage 208 or instead of storage 208.

Control circuitry 204 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 204 may also include scaler circuitry for up-converting and down-converting content into the preferred output format of the user equipment 200. Circuitry 204 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive enhanced interactive content data. The circuitry described herein, including, for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 208 is provided as a separate device from user equipment 200, the tuning and encoding circuitry (including multiple tuners) may be associated with storage 208.

A user may send instructions to control circuitry 204 using user input interface 210. User input interface 210 may be any suitable user interface, such as a remote control, mouse, trackball, keypad, keyboard, touchscreen, touchpad, stylus input, joystick, voice recognition interface, or other user input interfaces. Display 212 may be provided as a stand-alone device or integrated with other elements of each one of user equipment device 200 and user equipment system 201. For example, display 212 may be a touchscreen or touch-sensitive display. In such circumstances, user input interface 210 may be integrated with or combined with display 212. Display 212 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 212 may be HDTV-capable. In some embodiments, display 212 may be a 3D display, and the interactive application and any suitable content may be displayed in 3D. A video card or graphics card may generate the output to the display 212. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 204. The video card may be integrated with the control circuitry 204. Speakers 214 may be provided as integrated with other elements of each one of user equipment device 200 and user equipment system 201 or may be stand-alone units. The audio component of videos and other content displayed on display 212 may be played through speakers 214. In some embodiments, the audio may be distributed to a receiver (not shown), which processes and outputs the audio via speakers 214.

The content application may be implemented using any suitable architecture. For example, it may be a stand-alone application wholly implemented on each one of user equipment device 200 and user equipment system 201. In such an approach, instructions of the content application are stored locally (e.g., in storage 208), and data for use by the content application is downloaded on a periodic basis (e.g., from an out-of-band feed, from an Internet resource, or using another suitable approach). Control circuitry 204 may retrieve instructions of the content application from storage 208 and process the instructions to generate any of the displays discussed herein. Based on the processed instructions, control circuitry 204 may determine what action to perform when input is received from input interface 210. For example, movement of a cursor on a display up/down may be indicated by the processed instructions when input interface 210 indicates that an up/down button was selected.

In some embodiments, the content application is a client-server based application. Data for use by a thick or thin client implemented on each one of user equipment device 200 and user equipment system 201 is retrieved on-demand by issuing requests to a server remote to each one of user equipment device 200 and user equipment system 201. In one example of a client-server based content application, control circuitry 204 runs a web browser that interprets web pages provided by a remote server. For example, the remote server may store the instructions for the content application in a storage device. The remote server may process the stored instructions using circuitry (e.g., control circuitry 204) and generate the displays discussed above and below. The client device may receive the displays generated by the remote server and may display the content of the displays locally on equipment device 200. This way, the processing of the instructions is performed remotely by the server while the resulting displays are provided locally on equipment device 200. Equipment device 200 may receive inputs from the user via input interface 210 and transmit those inputs to the remote server for processing and generating the corresponding displays. For example, equipment device 200 may transmit a communication to the remote server indicating that an up/down button was selected via input interface 210. The remote server may process instructions in accordance with that input and generate a display of the content application corresponding to the input (e.g., a display that moves a cursor up/down). The generated display is then transmitted to equipment device 200 for presentation to the user.

In some embodiments, the content application is downloaded and interpreted or otherwise run by an interpreter or virtual machine (run by control circuitry 204). In some embodiments, the content application may be encoded in the ETV Binary Interchange Format (EBIF), received by control circuitry 204 as part of a suitable feed, and interpreted by a user agent running on control circuitry 204. For example, the content application may be an EBIF application. In some embodiments, the content application may be defined by a series of JAVA-based files that are received and run by a local virtual machine or other suitable middleware executed by control circuitry 204. In some of such embodiments (e.g., those employing MPEG-2 or other digital media encoding schemes), the content application may be, for example, encoded and transmitted in an MPEG-2 object carousel with the MPEG audio and video packets of a program.

Figure 3:
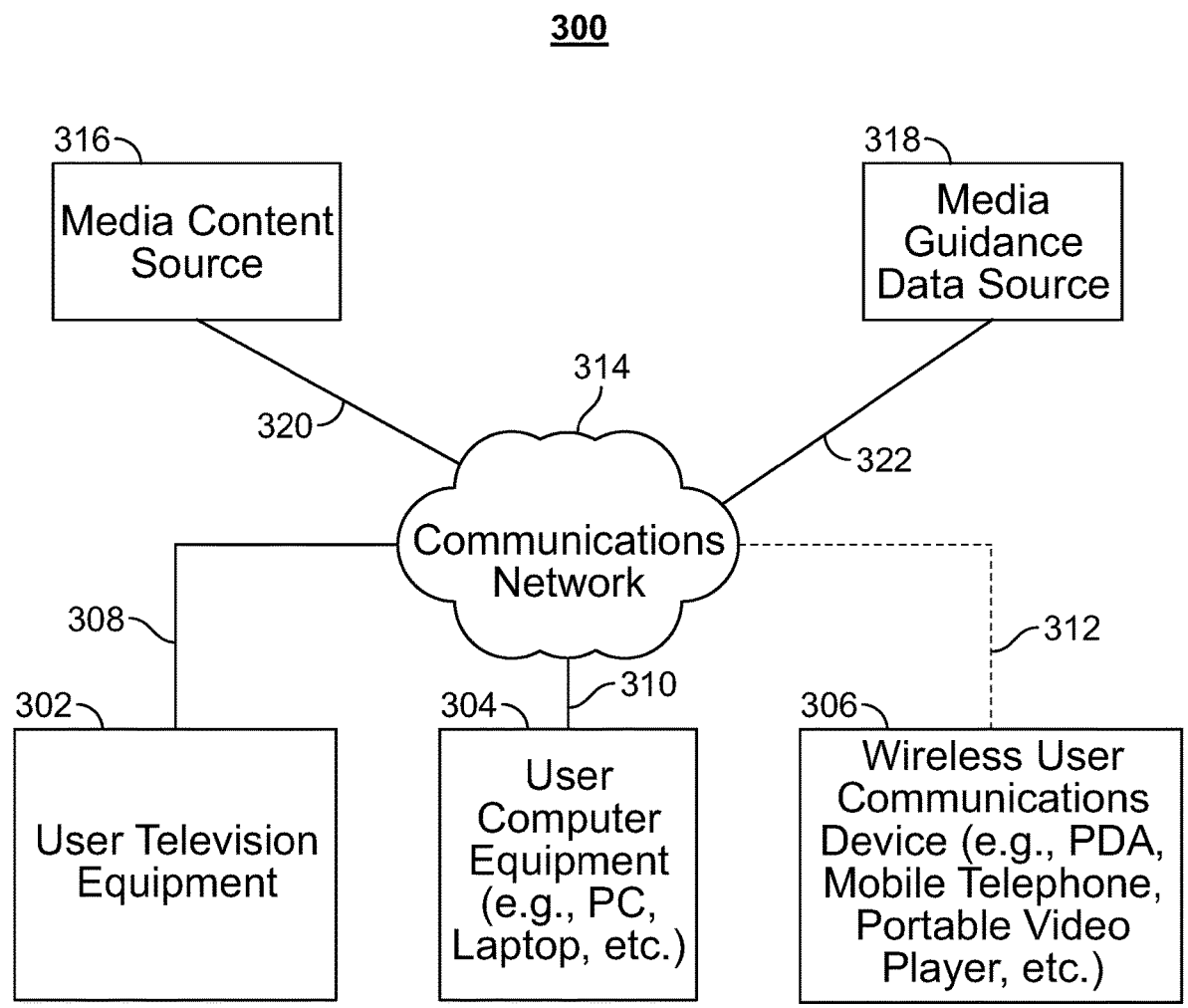
FIG. 3 is a block diagram of an illustrative media system in accordance with some embodiments of the present disclosure.

Each one of user equipment device 200 and user equipment system 201 of FIG. 2 can be implemented in system 300 of FIG. 3 as user television equipment 302, user computer equipment 304, wireless user communications device 306, or any other type of user equipment suitable for accessing content, such as a non-portable gaming machine. For simplicity, these devices may be referred to herein collectively as user equipment or user equipment devices and may be substantially similar to user equipment devices described above. User equipment devices, on which the content application may be implemented, may function as a standalone device or may be part of a network of devices. Various network configurations of devices may be implemented and are discussed in more detail below.

A user equipment device utilizing at least some of the system features described above in connection with FIG. 2 may not be classified solely as user television equipment 302, user computer equipment 304, or a wireless user communications device 306. For example, user television equipment 302 may, like some user computer equipment 304, be Internet-enabled allowing for access to Internet content, while user computer equipment 304 may, like some television equipment 302, include a tuner allowing for access to television programming. The content application may have the same layout on various different types of user equipment or may be tailored to the display capabilities of the user equipment. For example, on user computer equipment 304, the content application may be provided as a website accessed by a web browser. In another example, the content application may be scaled down for wireless user communications devices 306.

In system 300, there is typically more than one of each type of user equipment device but only one of each is shown in FIG. 3 to avoid overcomplicating the drawing. In addition, each user may utilize more than one type of user equipment device and also more than one of each type of user equipment device.

In some embodiments, a user equipment device (e.g., user television equipment 302, user computer equipment 304, wireless user communications device 306) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user equipment devices may be coupled to communications network 314. Namely, user television equipment 302, user computer equipment 304, and wireless user communications device 306 are coupled to communications network 314 via communications paths 308, 310, and 312, respectively. Communications network 314 may be one or more networks including the Internet, a mobile phone network, mobile voice or data network (e.g., a 4G or LTE network), cable network, public switched telephone network, or other types of communications network or combinations of communications networks. Paths 308, 310, and 312 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 312 is drawn with dotted lines to indicate that in the exemplary embodiment shown in FIG. 3 it is a wireless path and paths 308 and 310 are drawn as solid lines to indicate they are wired paths (although these paths may be wireless paths, if desired). Communications with the user equipment devices may be provided by one or more of these communications paths but are shown as a single path in FIG. 3 to avoid overcomplicating the drawing.

Although communications paths are not drawn between user equipment devices, these devices may communicate directly with each other via communication paths, such as those described above in connection with paths 308, 310, and 312, as well as other short-range point-to-point communication paths, such as USB cables, IEEE 1394 cables, wireless paths (e.g., Bluetooth, infrared, IEEE 302-11x, etc.), or other short-range communication via wired or wireless paths. BLUETOOTH is a certification mark owned by Bluetooth SIG, INC. The user equipment devices may also communicate with each other directly through an indirect path via communications network 314.

System 300 includes content source 316 and enhanced metadata source 318 coupled to communications network 314 via communication paths 320 and 322, respectively. Paths 320 and 322 may include any of the communication paths described above in connection with paths 308, 310, and 312. Communications with the content source 316 and enhanced metadata source 318 may be exchanged over one or more communications paths but are shown as a single path in FIG. 3 to avoid overcomplicating the drawing. In addition, there may be more than one of each of content source 316 and enhanced metadata source 318, but only one of each is shown in FIG. 3 to avoid overcomplicating the drawing. (The different types of each of these sources are discussed below.) If desired, content source 316 and enhanced metadata source 318 may be integrated as one source device. Although communications between sources 316 and 318 with user equipment devices 302, 304, and 306 are shown as through communications network 314, in some embodiments, sources 316 and 318 may communicate directly with user equipment devices 302, 304, and 306 via communication paths (not shown) such as those described above in connection with paths 308, 310, and 312. Enhanced metadata source 318 may contain an enhanced metadata database.

Content source 316 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 316 may be the originator of content (e.g., a television broadcaster, a Webcast provider, etc.) or need not be the originator of content (e.g., an on-demand content provider, an Internet provider of content of broadcast programs for downloading, etc.). Content source 316 may include cable sources, satellite providers, on-demand providers, Internet providers, over-the-top content providers, or other providers of content. Content source 316 may also include a remote media server used to store different types of content (including video content selected by a user), in a location remote from any of the user equipment devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Enhanced metadata source 318 may provide enhanced metadata, including contextual information for respective audio/video content objects provided by content source 316. Enhanced metadata may be provided to the user equipment devices using any suitable approach. In some embodiments, the content application may be a stand-alone application that receives enhanced metadata via a data feed (e.g., a continuous feed or trickle feed). Enhanced metadata and other data may be provided to the user equipment on a television channel sideband, using an in-band digital signal, using an out-of-band digital signal, or by any other suitable data transmission technique. Enhanced metadata and other data may be provided to user equipment on multiple analog or digital television channels.

In some embodiments, enhanced metadata from enhanced metadata source 318 may be provided to user equipment using a client-server approach. For example, a user equipment device may pull enhanced metadata from a server, or a server may push enhanced metadata to a user equipment device. In some embodiments, a content application client residing on the user's equipment may initiate sessions with source 318 to obtain enhanced metadata when needed, such as when the local enhanced metadata is out of date or when the user equipment device receives a request from the user to receive data. Enhanced metadata may be provided to the user equipment with any suitable frequency (e.g., continuously, daily, a user-specified period of time, a system-specified period of time, in response to a request from user equipment, etc.). Enhanced metadata source 318 may provide user equipment devices 302, 304, and 306 the content application itself or software updates for the content application.

Applications may be, for example, stand-alone applications implemented on user equipment devices. For example, the content application may be implemented as software or a set of executable instructions which may be stored in storage 208 and executed by control circuitry 204 of each one of user equipment device 200 and user equipment system 201. In some embodiments, applications may be client-server applications where only a client application resides on the user equipment device, and a server application resides on a remote server. For example, applications may be implemented partially as a client application on control circuitry 204 of each one of user equipment device 200 and user equipment system 201 and partially on a remote server as a server application (e.g., enhanced metadata source 318) running on control circuitry of the remote server. When executed by control circuitry of the remote server (such as enhanced metadata source 318), the content application may instruct the control circuitry to generate the content application displays and transmit the generated displays to the user equipment devices. The server application may instruct the control circuitry of the enhanced metadata source 318 to transmit data for storage on the user equipment. The client application may instruct control circuitry of the receiving user equipment to generate the content application displays.

Content and/or enhanced metadata delivered to user equipment devices 302, 304, and 306 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP need not be responsible for the viewing abilities, copyrights, or redistribution of the content, and, in one suitable approach, only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide enhanced metadata described above. In addition to content and/or enhanced metadata, providers of OTT content can distribute applications (e.g., web-based applications or cloud-based applications), or the content can be displayed by applications stored on the user equipment device.

System 300 is intended to illustrate a number of approaches, or network configurations, by which user equipment devices and sources of content and enhanced metadata may communicate with each other for the purpose of accessing content and providing respective contextual information. The embodiments described herein may be applied in any one or a subset of these approaches, or in a system employing other approaches for delivering content and providing contextual information.

For example, in one suitable approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 314. These cloud resources may include one or more content sources 316 and one or more enhanced metadata sources 318. In addition, or in the alternative, the remote computing sites may include other user equipment devices, such as user television equipment 302, user computer equipment 304, and wireless user communications device 306. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 304 or wireless user communications device 306 having a content capture feature. Alternatively, the user can first transfer the content to a user equipment device, such as user computer equipment 304. The user equipment device storing the content uploads the content to the cloud using a data transmission service on communications network 314. In some embodiments, the user equipment device itself is a cloud resource, and other user equipment devices can access the content directly from the user equipment device on which the user stored the content.

Cloud resources may be accessed by a user equipment device using, for example, a web browser, an application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 2.

Figure 4:
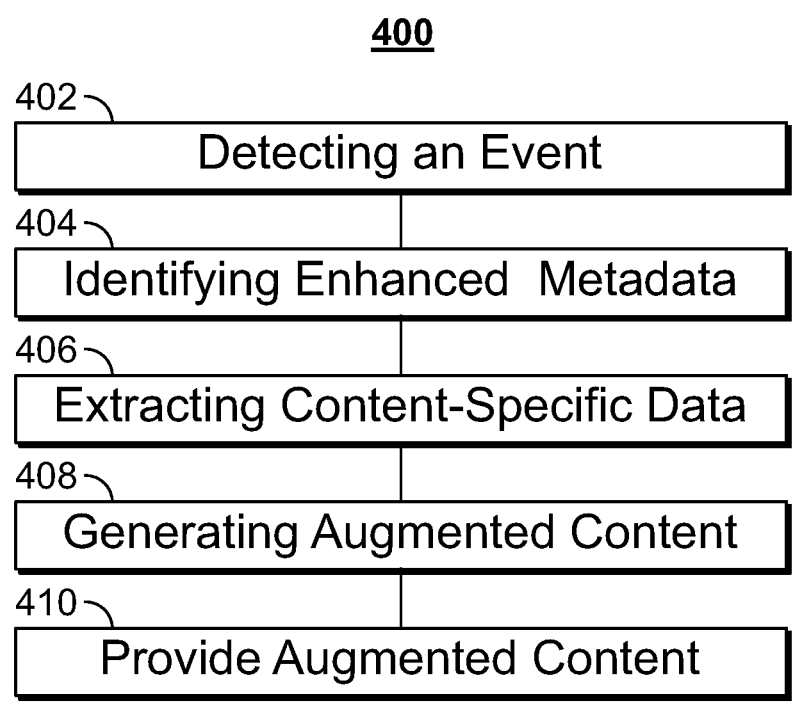
FIG. 4 is a flowchart of illustrative steps for providing augmented content in accordance with the present disclosure.

FIG. 4 shows a flowchart of illustrative steps 400 for augmenting audio/video content with interactive enhanced content in accordance with the present disclosure. At step 402, the content application detects an event occurring in the audio/video content. In some embodiments, enhanced metadata associated with the audio/video content may have been generated that defines time segments of the audio/video content as corresponding to respective events. For example, enhanced metadata communicated to user equipment 302/304/306 together with the audio/video content from media content source 316, enhanced metadata communicated to user equipment 302/304/306 from enhanced metadata source 318, or both may identify events within the audio/video content. In some embodiments, the content application may analyze audio/video content itself, to identify events therein. For example, closed-captioning data, also referred to herein as caption data, may be analyzed using any suitable language processor technology to identify when certain predefined events occur. To illustrate, the content application can identify audio/video content as being a soccer broadcast using any suitable tag information, metadata, or caption data indicating the nature of the audio/video content. Once the content is determined to be a soccer game broadcast, the content application identifies a list of possible events that occur in a soccer match (e.g., by accessing enhanced metadata from enhanced metadata source 318). In one suitable approach, each of the events may be associated with one or more respective keywords. Caption data is then analyzed to determine which of the events occur and when they occur based on the keywords. In another suitable approach, the audio data portion of the audio/video content, to the extent there is one, may be analyzed by the content application using any suitable language recognition techniques to identify the keywords in order to identify events and have them correspond to respective time segments. In one suitable approach, the content application may analyze the video data of the audio/video content using, for example, any suitable computer vision technique to identify people, places, and things in corresponding video frames that indicate the occurrence of an event.

The content application may identify events in prerecorded audio/video content as well as during live broadcasts of audio/video content using, for example, any of the applicable techniques discussed above. The content application may identify more than one event for any particular time segment of the audio/video content. Events may overlap entirely or partially. For example, a time segment for a first event might also entirely include a second event, where the duration of the first event is at least as long as that of the second event. A partial overlap is possible where a first event occurs during a portion of a second event.

When events are identified, the content application may create identifiers that correlate the identified events to their respective time segments of the audio/video content. The identifiers may be stored locally at the user equipment, may be communicated and stored at, for example, the enhanced metadata source 318 as enhanced metadata (e.g., for future use by this and other users), or both.

At step 404, for each of the identified events in the audio/video content, the content application identifies corresponding enhanced metadata. As previously discussed, enhanced metadata may be accessed from the audio/video content itself, from a remote enhanced metadata database, such as from enhanced metadata source 318, or both. Enhanced metadata may be organized and indexed in any suitable one or more ways. For example, in some embodiments, enhanced metadata organization and architecture may be defined according to type or genre of audio/video content. In one suitable approach, enhanced metadata may be indexed according to event. In such a system, each event may correspond to a set of types of data that are specific to the type of audio/video content. For example, for a sports broadcast, at least some events may correspond to a set of competition rules and definitions of terms. Any other suitable types of data can be used to define metadata for a type of event and a type of audio/video content.

Using a sports broadcast as the audio/video content to illustrate, the content application may identify enhanced metadata corresponding to events detected in the broadcast. The enhanced metadata may include, for example, rules associated for each respective event (e.g., what happens during a home run in baseball) as well as any other suitable information specific to the particular sport or competition being played (e.g., definition of a "safety" in American football). Enhanced metadata for sports broadcasts may also include any other suitable information such as historical statistics data, bracket information, player information, any other suitable information, or any combination thereof.

At step 406, the content application extracts content-specific data from the audio/video content. The content-specific data provides information about an event that is specific to the particular audio/video content being analyzed. For example, content-specific data may include names of people, places, and things associated with an event identified by the content application. While enhanced metadata includes general information about the event, the content-specific data may provide more focused details about what is happening in a particular event within the audio/video content. As illustrated in the soccer game broadcast example of FIG. 1, content-specific data includes names of players involved in respective events.

In some embodiments, the content application may extract certain content-specific data to supplement enhanced metadata identified at step 404. For example, with reference to FIG. 1, enhanced content 116 includes an event description indicating that a yellow card was used. The enhanced metadata, in this example, may have fields associated with this event description that can be filled in with content-specific data that specifies the name of the player against whom the yellow card was used (i.e., Smith), what the infraction was that caused the yellow card to be used (i.e., tackling), and the name of the player whom the infraction was against (i.e., Johnson), if applicable. In some embodiments, different versions of such fill-in-the-blank enhanced metadata can be maintained and used depending on the content-specific data made available. If no content-specific data can be extracted from the available enhanced metadata, then the content application may choose to use a generic enhanced metadata item.

The content application may analyze the audio/video content in an attempt to extract particular content-specific data that may, in one suitable approach, be defined by the enhanced metadata. For example, the enhanced metadata identified at step 404 may indicate to the content application which content-specific data to look for in the audio/video content. For a sports broadcast, for example, the content application will know to look for, for example, players' names, team names, scores, or any other suitable soccer and sports competition-specific information.

The content application may extract content-specific data from any suitable one or more data sources using any suitable one or more processing techniques. For example, the content application may use any suitable language processing techniques to analyze the caption data associated with a particular audio/video content, to the extent it is available. The content application may use any suitable voice recognition and language processing techniques to analyze audio data in audio/video content, to the extent it is available. The content application may analyze program guide data (e.g., made available to the content application in ways similar to the enhanced metadata from enhanced metadata source 318, for example). Any such suitable techniques may be used to extract content-specific data. In some embodiments, the content application may access information from servers that provide relevant information about events that might occur in the audio/video content. For example, for a live sports broadcast, the content application may access and extract data from a web server that hosts a website with real-time information regarding what is happening in the subject sports competition.

At step 408, the content application generates augmented content based on the audio/video content, the enhanced metadata, and the content-specific data. The augmented content includes the original audio/video content as well as enhanced interactive content. For example, for every time segment in the audio/video content during which the content application identifies at least one event, the content application may include in the augmented content a visual user-selectable indicator, such as indicators 104 and 106 in the example illustrated in FIG. 1, each indicator representing a respective event. For every event, the content application generates contextual information using the enhanced metadata and content-specific data identified and extracted at steps 404 and 406, respectively.

The content application generates contextual information as part of the augmented content according to any suitable technique. For example, each event for a particular type of audio/video content may have one or more corresponding predefined templates that the content application may use for generating the contextual information. For example, a template may include certain predefined textual verbiage, graphics, or both, that are used to provide additional information about the event. Different templates may be available for the same event. The content application may choose which template to use based on, for example, what enhanced metadata, content-specific data, or both, are available. Templates may be provided as part of the enhanced metadata. A template may include general information about the event that would be applicable to the type of event that occurred in the subject audio/video content as well as in other audio/video content of the same type as the subject audio/video content. General information about an event would preferably be generated according to enhanced metadata. A template may also include information specific to the subject audio/video content, which would preferably be generated according to content-specific data. A template may contain a combination of general information and specific information about the event. For example, a template may include general information with fields to be filled in with specific information provided by the content-specific data. As another example, a template for a sport broadcast event may include a subject rule of the event as well as an application of the rule to that particular event. This is illustrated in FIG. 1, previously discussed.

At step 410, the content application provides the augmented content to user equipment for display to a user on a display device. When the content application detects an event occurring in the audio/video content, the content application causes an indicator to be displayed simultaneously with the audio/video content until the conclusion of the event or within a defined time period of the conclusion of the event. The indicator indicates to the user that an event has been detected and that contextual information is available for the detected event. A user may be given the ability to select the indicator using any suitable technique, such as by using a mouse, a remote control, a touch-sensitive display, any other suitable technique, or any combination thereof. An indicator may be any suitable graphical element (including a static image, an animated image, or both), textual element, or both. An indicator may be selected by the content application based on the event. For example, an image typically associated with the event may be used (e.g., an image of a yellow card can be used as the indicator to denote that a yellow card has been used in a broadcast of a soccer game).

When there are multiple events taking place in an overlapping time period, the content application may display respective indicators for each event. In this case, each image may be distinguishable from the other. In some embodiments, the content application may display the same image for each event or for certain groups of events.

Upon selection of the indicator, the corresponding contextual information is displayed by the content application. The contextual information may include textual elements, graphic element, or both. In some embodiments, the contextual information is scrollable by the user using any suitable input technique. In some embodiments, the contextual information may be selectable by the user to display additional contextual information (e.g., to obtain more detailed information about the event).

It will be understood that FIG. 4 is merely illustrative and that the steps shown may be performed in any suitable order. For example, detecting an event and extracting content-specific data may occur in parallel (in whole or in part). As another example, identifying enhanced metadata may occur in parallel with either detecting an event, extracting content-specific data, or both (in whole or in part).

While the present disclosure is provided primarily in the context of the audio/video content being a sports broadcast, it will be understood that this merely illustrative and is not intended to limit the scope of the functionality disclosed herein. In some embodiments, for example, the content application may operate on dramatic television shows and films. In this example, the content application may detect events such as a character crying. The content application may generate contextual information in accordance with the present disclosure that may indicate that the character had been in a relationship with a particular other character and is crying in response to that relationship ending. This provides benefit to a user who may not have seen enough of the television show or movie to understand why the character is crying. Enhanced metadata may include information about the relationship with the other character (e.g., if this audio/video content is a later episode in a long-running show and an enhanced metadata database of the plot or certain arcs of the plot is available). Content-specific data may be that the relationship ended (e.g., the current audio/video content is where the end of the relationship is first disclosed).

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A computer-implemented method for augmenting audio/video content, the method comprising:
   determining, using processing equipment, that the audio/video content is related to a sports broadcast of a particular sport;
   identifying, using the processing equipment, enhanced metadata associated with the particular sport in an enhanced metadata database;
   identifying, using the processing equipment, a plurality of possible events that may occur during the particular sport and rules associated with the plurality of possible events, based on the enhanced metadata associated with the particular sport;
   detecting, using the processing equipment, an event among the plurality of possible events during a time segment of the audio/video content based on data in the audio/video content corresponding to the time segment;

identifying, using the processing equipment, enhanced metadata associated with the event in the enhanced metadata database, the identified enhanced metadata associated with the event comprising a rule associated with the event among the rules associated with the plurality of possible events and an application of the rule to the event;

extracting, using the processing equipment, content-specific data from the audio/video content;

augmenting, using the processing equipment, the audio/video content with the rule associated with the event, with the application of the rule to the event, and with the content-specific data to generate augmented content; and providing the augmented content for display on user equipment during playback of the time segment.

2. The method of claim 1, wherein the time segment is a first time segment, and
wherein the method further comprises:
identifying a second event among the plurality of possible events in a second time segment of the audio/video content that at least partially overlaps with the first time segment; and
identifying second enhanced metadata associated with the second event, the identified second enhanced metadata associated with the second event comprising a second rule associated with the second event among the rules associated with the plurality of possible events and an application of the second rule to the second event, wherein augmenting the audio/video content comprises augmenting the audio/video content with the rule associated with the event, the application of the rule to the event, the content-specific data, the second rule associated with the second event, and the application of the second rule to the second event to generate augmented data.

3. The method of claim 2, further comprising extracting second content-specific data from the audio/visual content, wherein augmenting the audio/video content comprises augmenting the audio/video content with the rule associated with the event, the application of the rule to the event, the content-specific data, the second rule associated with the second event, the application of the second rule to the second event, and the second content-specific data to generate augmented data.

4. The method of claim 1, wherein providing the augmented content for display on user equipment during playback of the time segment comprises causing to be simultaneously displayed on the user equipment during the time segment content from the audio/video content and interactive content associated with the event.

5. The method of claim 1, wherein extracting the content specific data from the audio/video content comprises extracting the content-specific data from closed-captioning data of the audio/video content.

6. The method of claim 1, wherein the plurality of possible events that may occur during the particular sport comprise a list of possible events.

7. A system for augmenting audio/video content, the system comprising:
electronic storage equipment configured to store an enhanced metadata database; and
processing equipment coupled to the electronic storage equipment and configured to:

determine that the audio/video content is related to a sports broadcast of a particular sport,
identify enhanced metadata associated with the particular sport in the enhanced metadata database,
identify a plurality of possible events that may occur during the particular sport and rules associated with the plurality of possible events, based on the enhanced metadata associated with the particular sport,
detect an event among the plurality of possible events during a time segment of the audio/video content based on data in the audio/video content corresponding to the time segment,
identify enhanced metadata associated with the event in the enhanced metadata database, the identified enhanced metadata associated with the event comprising a rule associated with the event among the rules associated with the plurality of possible events and an application of the rule to the event,
extract content-specific data from the audio/video content,
augment the audio/video content with the rule associated with the event, with the application of the rule to the event, and with the content-specific data to generate augmented content, and
provide the augmented content for display on user equipment during playback of the time segment.

8. The system of claim 7, wherein the time segment is a first time segment, and
wherein the processing equipment is further configured to:
identify a second event among the plurality of possible events in a second time segment of the audio/video content that at least partially overlaps with the first time segment;
identify second enhanced metadata associated with the second event, the identified second enhanced metadata associated with the second event comprising a second rule associated with the second event among the rules associated with the plurality of possible events and an application of the second rule to the second event; and
augment the audio/video content with the rule associated with the event, the application of the rule to the event, the content-specific data, the second rule associated with the second event, and the application of the second rule to the second event to generate augmented data.

9. The system of claim 8, wherein the processing equipment is further configured to:
extract second content-specific data from the audio/visual content; and
augment the audio/video content with the rule associated with the event, the application of the rule to the event, the content-specific data, the second rule associated with the second event, the application of the second rule to the second event, and the second content-specific data to generate augmented data.

10. The system of claim 7, wherein the processing equipment is further configured to cause to be simultaneously displayed on the user equipment during the time segment content from the audio/video content and interactive content associated with the event.

11. The system of claim 7, wherein the processing equipment is further configured to extract the content-specific data from closed-captioning data of the audio/video content.

12. A non-transitory computer readable medium having computer instructions stored thereon for programming a computer to perform a method comprising:

determining, using processing equipment, that audio/video content is related to a sports broadcast of a particular sport;

identifying, using the processing equipment, enhanced metadata associated with the particular sport in an enhanced metadata database;

identifying, using the processing equipment, a plurality of possible events that may occur during the particular sport and rules associated with the plurality of possible events, based on the enhanced metadata associated with the particular sport;

detecting, using the processing equipment, an event among the plurality of possible events during a time segment of the audio/video content based on data in the audio/video content corresponding to the time segment;

identifying, using the processing equipment, enhanced metadata associated with the event in the enhanced metadata database, the identified enhanced metadata associated with the event comprising a rule associated with the event among the rules associated with the plurality of possible events and an application of the rule to the event;

extracting, using the processing equipment, content-specific data from the audio/video content;

augmenting, using the processing equipment, the audio/video content with the rule associated with the event, with the application of the rule to the event, and with the content-specific data to generate augmented content; and providing the augmented content for display on user equipment during playback of the time segment.

13. The non-transitory computer readable medium of claim 12, wherein the time segment is a first time segment, and wherein the method further comprises:
identifying a second event among the plurality of possible events in a second time segment of the audio/video content that at least partially overlaps with the first time segment; and identifying second enhanced metadata associated with the second event, the identified second enhanced metadata associated with the second event comprising a second rule associated with the second event among the rules associated with the plurality of possible events and an application of the second rule to the second event, wherein augmenting the audio/video content comprises augmenting the audio/video content with the rule associated with the event, the application of the rule to the event, the content-specific data, the second rule associated with the second event, and the application of the second rule to the second event to generate augmented data.

14. The non-transitory computer readable medium of claim 13, wherein the method further comprises extracting second content-specific data from the audio/visual content, wherein augmenting the audio/video content comprises augmenting the audio/video content with the rule associated with the event, the application of the rule to the event, the content-specific data, the second rule associated with the second event, the application of the second rule to the second event, and the second content-specific data to generate augmented data.

15. The non-transitory computer readable medium of claim 12, wherein providing the augmented content for display on user equipment during playback of the time segment comprises causing to be simultaneously displayed on the user equipment during the time segment content from the audio/video content and interactive content associated with the event.

16. The non-transitory computer readable medium of claim 12, wherein extracting the content specific data from the audio/video content comprises extracting the content-specific data from closed-captioning data of the audio/video content.

* * * * *